May 9, 1961 O. R. HUGGINS 2,983,010
GUY HOOK FOR ATTACHMENT TO TRANSMISSION LINE POLES OR THE LIKE
Filed Nov. 5, 1959 3 Sheets-Sheet 1
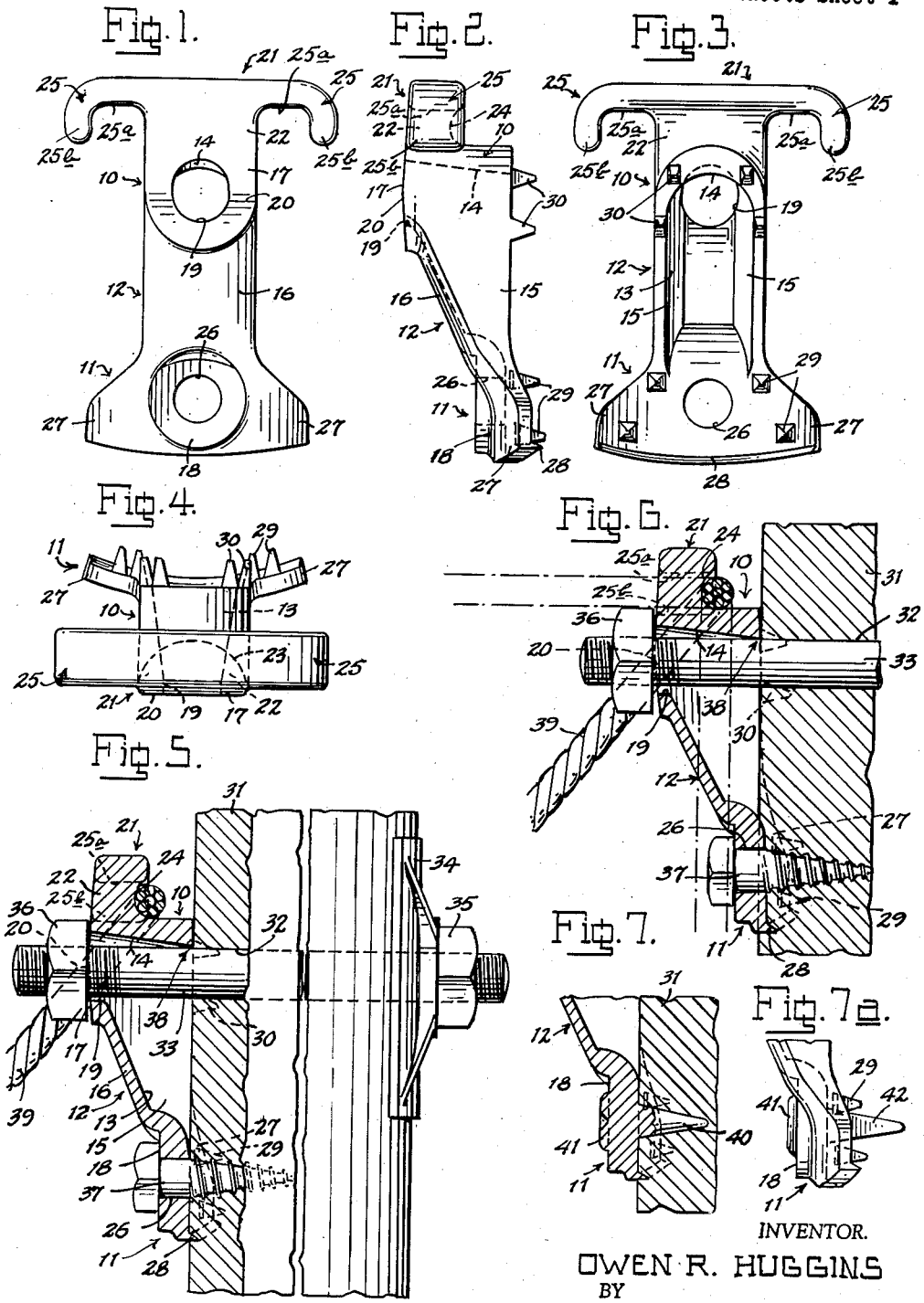
INVENTOR.
OWEN R. HUGGINS
BY
ATTORNEY.

May 9, 1961 O. R. HUGGINS 2,983,010
GUY HOOK FOR ATTACHMENT TO TRANSMISSION LINE POLES OR THE LIKE
Filed Nov. 5, 1959 3 Sheets-Sheet 2
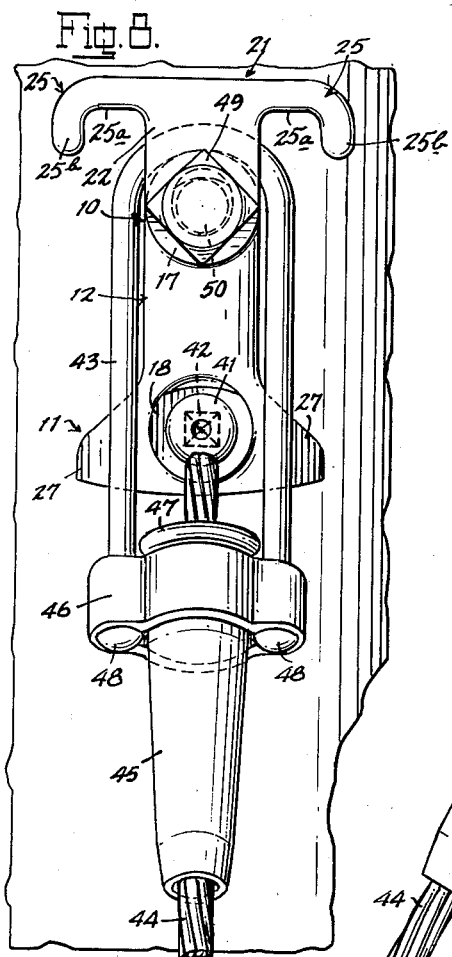
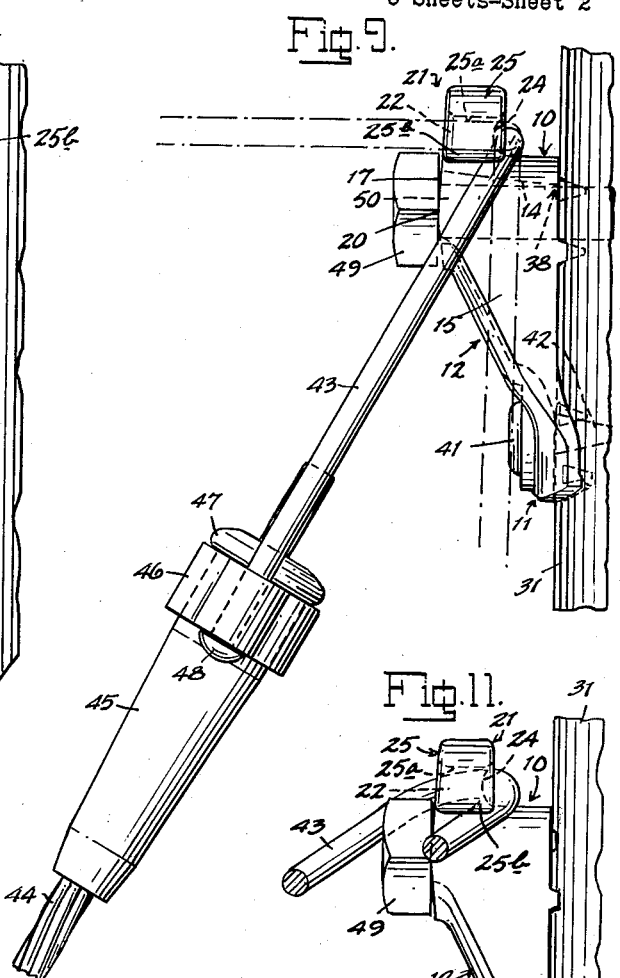
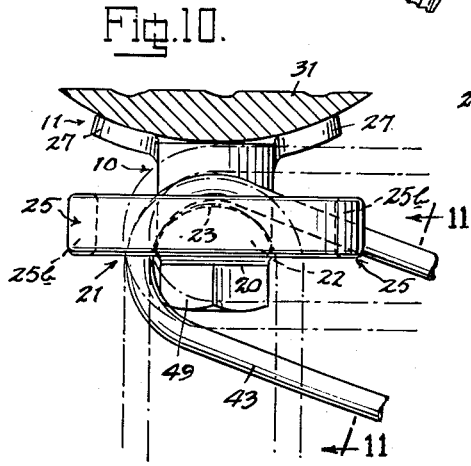
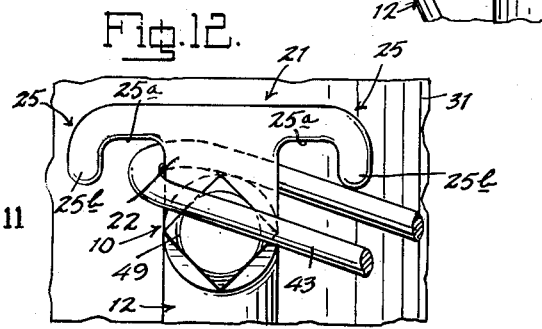
INVENTOR.
OWEN R. HUGGINS
BY
ATTORNEY.

May 9, 1961　　　O. R. HUGGINS　　　2,983,010
GUY HOOK FOR ATTACHMENT TO TRANSMISSION LINE POLES OR THE LIKE
Filed Nov. 5, 1959　　　　　　　　　　　　　　3 Sheets-Sheet 3
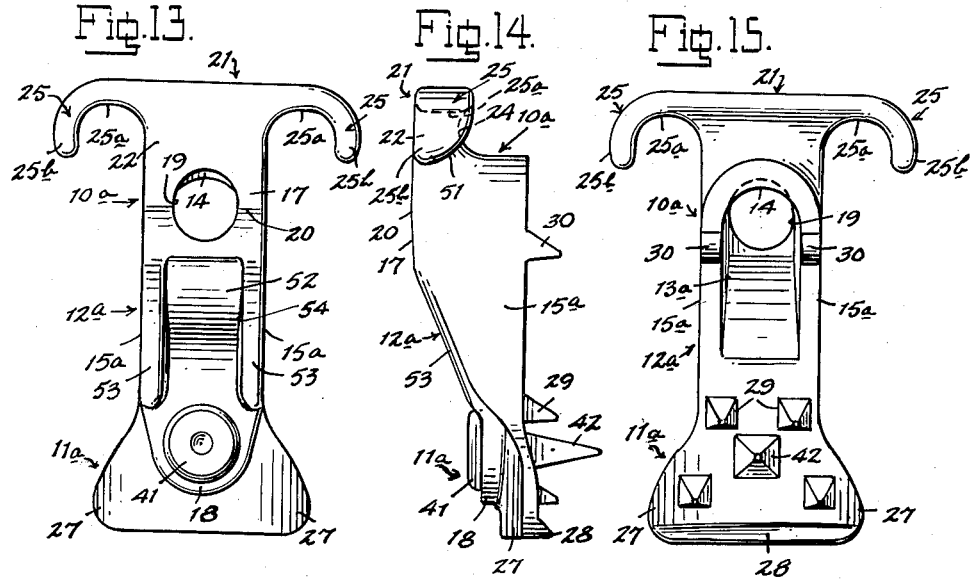
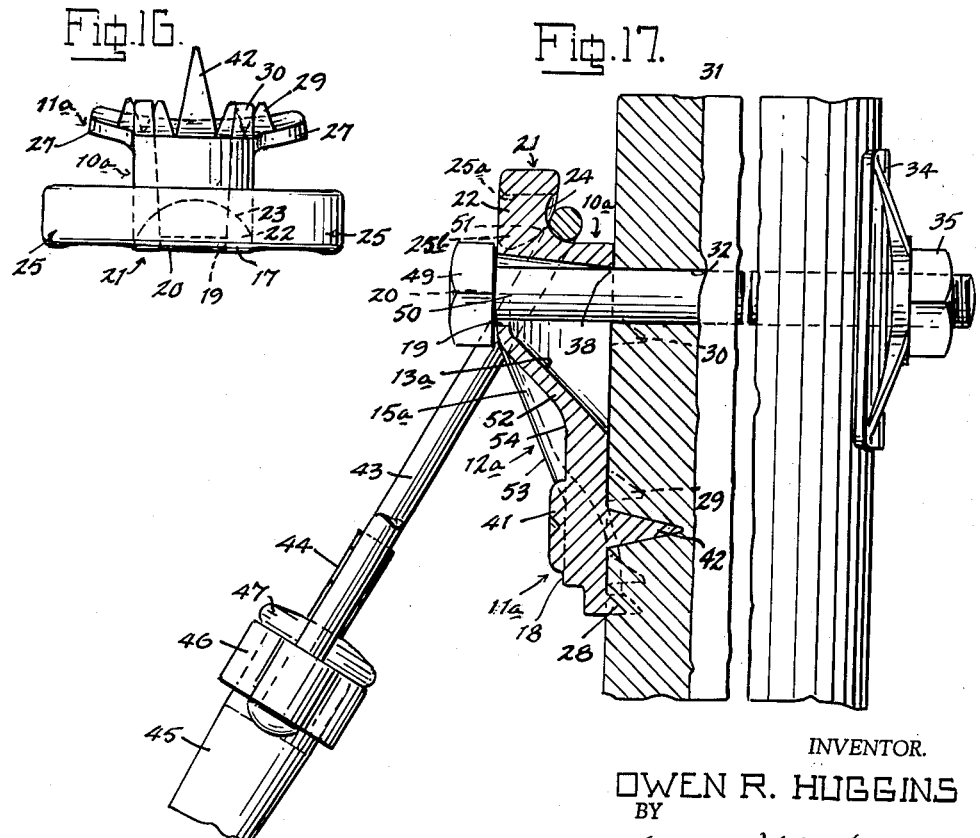
INVENTOR.
OWEN R. HUGGINS
BY
ATTORNEY ── # United States Patent Office 2,983,010
Patented May 9, 1961

2,983,010

GUY HOOK FOR ATTACHMENT TO TRANSMISSION LINE POLES OR THE LIKE

Owen R. Huggins, Darien, Conn., assignor to Malleable Iron Fittings Company, Branford, Conn., a corporation of Connecticut Filed Nov. 5, 1959, Ser. No. 851,143

12 Claims. (Cl. 24—115)

This invention relates to a guy hook for attachment to transmission line poles or the like, and the present application is a continuation-in-part of co-pending application Serial No. 800,828 filed March 20, 1959 and now abandoned. In particular the invention constitutes an improvement over prior guy hook structures as disclosed, for instance, in the patent to Roland G. Williams, No. 1,855,564 granted April 26, 1932, reissued as Re. 18,613 dated October 4, 1932, and the patent to Kenneth C. Jenne, No. 2,643,428 granted June 30, 1953. These prior guy hook structures consist generally of an upper hub portion having hook means about which the loop of a guy cable is engaged and provided with a horizontal passage engaged by the through-bolt extending through the pole, a downwardly extending heel portion engaging the vertical surface of the pole below the through-bolt and being usually secured to the pole by a lag screw or spike. The horizontal passage through the hub has an upper through-bolt engaging surface of substantially cylindrical form extending parallel to the axis of the through-bolt between the rearward surface of the hub which engages the pole and the forward surface engaged by the retaining nut upon the through-bolt. These prior guy hooks operate on the principle that, following the initial installation, with the guy hook in a substantially vertical position normal to the through-bolt axis, optimum performance is reached at the point where the load imposed by the downwardly and outwardly extending guy cable causes the guy hook to be tilted or overturned from its initial position, with the result that the pole engaging heel digs into the pole to thus resist down-slotting, and by its overturning action places the bolt in tension to a very great extent with almost no shear. Actually, because the upper surface of the bolt receiving passage is parallel to the axis of the bolt and at ninety degrees to the rearward or pole engaging surface of the guy hook, the optimum performance of the guy hook does not take place until the bolt has been bent by the vertical component of the load placed thereon, following which bending the guy hook can overturn and its heel dig in and resist down-slotting, thus putting the bolt in tension only after and to the extent that the bolt is bent by the load.

It is an object of the present invention to provide a guy hook wherein the overturning action following the initial installation may take place without bending the through-bolt. To this end, it is proposed to provide a through-bolt passage having an upper surface which extends at an upward and outward angle from the pole-engaging rearward surface, and hence at an outwardly divergent angle to the through-bolt. With this arrangement the rearward end of the upper surface of the passage has fulcrum engagement with the through-bolt adjacent the pole surface, so that the guy hook may be overturned about the fulcrum point to cause its heel to increasingly dig into the pole without bending the through-bolt, the forward side of the hub at the same time having slipping action relative to the retaining nut of the through-bolt. Thus the load upon the overturned guy hook places the unbent through-bolt in tension with a minimum of shear force applied thereon at the fulcrum point adjacent the pole surface.

In the guy hooks as disclosed in the Williams and Jenne patents referred to above, the hook means provided upon the hub portion is such that the loop end of a flexible guy cable may be engaged over the hub portion with the sides of the loop carried beneath hook formations at each side of the hub portion, these hook formations having their lower surfaces below the upper surface of the hub portion. In the Williams patent the lower surfaces of the hook formations are also substantially below the horizontal axis of the through-bolt, so that with the guy cable in a substantially horizontal take-off position, that is a position at 90 degrees to the vertical axis of the pole, the guy cable is given a transverse bend of substantially 90 degrees, the end of the through-bolt tends to bend upwardly, and the pulling force is such that the lower end or heel of the guy hook tends to pull away from the pole, as distinguished from the desired overturning action which forces the heel to dig into the pole to resist the increasing shear force on the guy hook. In the Jenne patent the under surfaces of the hook formations are substantially in the same horizontal plane as the axis of the through-bolt, so that under the same 90 degree pull-off condition the guy cable is given a transverse bend of substantially 90 degrees with the direction of the pull in line with the through-bolt axis, so that while the pulling force places the through-bolt in tension it also pulls up on the hook formations, thus minimizing or eliminating the desired overturning action.

It is a further object of the present invention to provide a guy cable connecting means at the upper end of the guy hook substantially in the form of a T extending upwardly from the hub portion and having hook formations at each side of the upright of the T with their lower surfaces sufficiently higher than the upper surface of the hub portion to enable the guy cable to assume a 90 degree take-off position without bending or distortion, as distinguished from the bend placed in the guy cable in the structures disclosed in the Williams and Jenne patents. The arrangement also raises the load point substantially above the fulcrum point of engagement of the guy hook with the through-bolt, thus increasing the overturning moment placed upon the guy hook by the pulling force of the guy cable in any angular position of the guy cable.

In certain installations the guy cable is provided at its end with a connector provided with a hard or rigid bail for engagement with the guy hook, as distinguished from the relatively flexible loop formed by bending the end portion of the guy cable back upon itself and securing its terminal end by suitable clamps. This hard or rigid bail usually consists of a U-shape member formed from heavy rod stock having its side legs connected to a yoke member in which is seated a gripping vise unit in which the end of the guy cable is received and retained against retractive movement. This gripping unit may for example be of the type disclosed in the patent to Fotsch, No. 2,138,913 dated December 6, 1938, which discloses a device which permits free insertion of the end of a rod or cable in one direction and by means of internal gripper or vise members resists movement in the other direction. It is desirable that the connector with its bail be completely assembled upon the cable on the ground, and that it may thereupon be quickly and easily connected to the guy hook by a lineman working on the pole to which the guy hook is attached.

It is a further object of the invention to provide a guy hook having a guy cable connecting hook means which permits the ready engagement of the rigid bail of the connector attached to the guy cable, and further to provide a guy hook structure which permits the guy cable to assume any desired angular position, between a substantially vertical position parallel to the axis of the pole and a take-off position substantially at 90 degrees to the axis of the pole, without distortion or bending of the rigid bail.

Another object is to provide a guy hook in which the intermediate portion connecting the hub portion to the heel portion has incorporated therein an improved structural shape wherein the stresses created between the hub and the heel portions, when load is placed upon the guy hook and it is subjected to an overturning action causing the heel portion to dig into the pole, are so directed that the supporting strut-like structure of the intermediate portion is placed under stress which is substantially wholly compressive as distinguished from previous types of guy hooks wherein the structural shape of the intermediate portion is subjected at least in part to a substantial tensile stress. Since the guy hook of the invention is preferably in the form of a malleable iron casting, the improved structural shape of the intermediate portion is of particular importance as cast sections are generally far weaker in tension than in compression and therefore are subject to more frequent distortion failure and fracture under heavy or excessive loads.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a front elevation of the guy hook, according to the invention;

Fig. 2 is a side elevation;

Fig. 3 is a rear elevation;

Fig. 4 is a top plan view;

Fig. 5 is a vertical sectional view showing the guy hook installed upon a pole with a guy cable engaged therewith, the guy hook being shown in its relation prior to the imposition of load to cause overturning;

Fig. 6 is a sectional view, similar to Fig. 5, showing the guy hook in its overturned relation following imposition of load;

Fig. 7 is a fragmentary vertical sectional view, similar to Fig. 5, showing a modified form of guy hook having an integral conical spike of round cross-section;

Fig. 7a is a fragmentary side elevation of a further modified form of guy hook having an integral conical spike of square cross-section;

Fig. 8 is a front elevation showing the guy hook installed upon a pole and engaged by a guy cable connector of the type having a hard or rigid bail;

Fig. 9 is a side elevation of the guy hook and guy cable connector as seen in Fig. 8, the dot-and-dash lines showing take-off positions of the connector respectively in horizontal and substantially vertical positions;

Fig. 10 is a top plan view partially in horizontal section showing the manner in which the bail of the guy cable connector is engaged with the guy hook, the dot-and-dash lines showing respectively the initial and final engaged positions of the bail, and the full lines showing an intermediate position;

Fig. 11 is a fragmentary side elevation partially in vertical section along the line 11—11 of Fig. 10, showing the intermediate position of the bail;

Fig. 12 is a fragmentary front elevation of the parts as seen in Fig. 11;

Fig. 13 is a front elevation of the guy hook, according to a modified form of the invention;

Fig. 14 is a side elevation;

Fig. 15 is a rear elevation;

Fig. 16 is a top plan view; and

Fig. 17 is a vertical sectional view showing the guy hook of Figs. 13–16 installed upon a pole and engaged by a guy cable connector of the type having a hard or rigid bail.

Referring to Figs. 1–6 of the drawings, the guy hook, according to the exemplary embodiment of the invention illustrated therein, is preferably formed of malleable cast iron and comprises an upper hub portion 10, a lower heel portion 11, and an intermediate connecting portion 12. The guy hook is of generally channel shape at its rearward side, the rearwardly facing cavity 13 being defined at its upper end by the upper arched wall 14 of the through-bolt receiving passage through the hub portion, and by the side walls 15—15 and the front wall 16 of the intermediate connecting portion 12, said front wall 16 being inclined downwardly and inwardly from the forward wall 17 of the hub portion to the forward wall 18 of the heel portion 11.

The upper arched wall 14 of the through-bolt receiving passage is inclined upwardly and outwardly from the substantially vertically disposed rearward pole engaging side of the hub portion and the through-bolt receiving passage opens to a through-bolt receiving hole 19 in the forward wall 17 of the hub portion, this hole being slightly oval in its vertical dimension, for a purpose presently to more fully appear.

The forward wall 17 of the hub portion is slightly arched in its vertical dimension so that a horizontal rounded ridge 20 is provided at each side of the hole 19 for rocking or slipping engagement with the retaining nut or head of the through-bolt, for a purpose presently to more fully appear. A hook formation 21 is integrally formed upon the upper side of the hub portion as an upward continuation of its forward wall 17 and comprises a neck portion 22 of substantially semi-circular outline in horizontal cross section, as indicated at 23 in Fig. 4, and concavely recessed at its rearward side, as at 24, to receive the loop of a guy cable, and a pair of outwardly and downwardly directed hook portions 25—25 extending laterally from each side of the upper end of the neck portion to retain the loop of the guy cable upon the guy hook.

The heel portion 11 is provided with a hole 26 for receiving a lag screw or spike, as will presently more fully appear, and its forward wall 18 has a vertically disposed planar bearing surface for engagement by the head of the lag screw. The heel portion is flared outwardly to a substantial degree at each side, as at 27, and its rearward surface is concavely curved to substantially conform to a round pole surface over a relatively large area, the central vertical line of the rearward heel surface being substantially in the vertical plane of the rearward pole engaging surface of the hub portion 10. At its lower edge the heel portion is provided with a tooth-like rib 28 adapted to dig into the pole upon securing the guy hook thereto, as will presently more fully appear. The heel portion is provided with spurs 29 suitably distributed in outwardly spaced relation to the hole 26 for the purpose of digging into the pole to increase the resistance of the guy hook to down-slotting, and additional spurs 30 are provided upon the rearward pole engaging side of the hub portion 10.

As seen in Fig. 5, the pole 31 is provided with a diametrically extending hole 32 for the through-bolt 33, the threaded ends of which project from the ends of the hole 32, a curved washer 34 being engaged upon one end of the bolt and secured by a nut 35, and the guy hook of the invention being engaged upon the other end. The through-bolt is projected through the hole 19 of the hub portion 10 and a nut 36 upon the end of the through-bolt is tightened against the front wall 17 of the hub, its rearward surface being engaged with the ridge 20 at each side of the hole 19. The nut is tightened to the point where the substantially rearwardly disposed pole engaging side of the guy hook firmly engages the pole surface with the rib 28 and the spurs 29 and 30 embedded in the pole. The embedding of the rib 28 and spurs 29 is brought about by fastening the heel portion by means of a lag screw 37, the screwing in of the lag screw being preferably carried out substantially simultaneously and in cooperation with the tightening of the nut 36. It will be observed that at this point the guy hook is substantially vertically disposed upon the pole, and the rearward end of the bolt receiving passage is in engagement with the through-bolt at a fulcrum point, indicated at 38, contiguous to the surface of the pole. Thus the lever arm on the bolt is shortened, placing the load adjacent the pole instead of out on the bolt at the face of the guy hook as heretofore.

The loop 39 of a guy cable is engaged over the guy hook and as load is placed thereon, as by tightening the guy cable, the upper part of the hub portion constitutes a lever arm which fulcrums at the fulcrum point 38 to cause the guy hook to overturn or tilt about the fulcrum point and the heel portion to increasingly dig into the pole, as shown in Fig. 6, at which point the lag screw can be tightened to retain this overturned position of the guy hook. A substantially larger component of the load is thus transferred to the dug in heel portion than has been the case with previous guy hooks. During this action the forward wall 17 of the hub portion will rock or slip against the rearward side of the retaining nut 36, the through-bolt remaining straight by virtue of the clearances provided in the bolt receiving passage by the upwardly and outwardly inclined upper wall 14 and by the arched form of the forward wall 17.

The vertical component of the load is thus resisted by the digging in of the heel portion of the guy hook into the pole and by the engagement of the hub portion with the through-bolt at the fulcrum point 38 contiguous to the pole surface where bending or shear strain upon the through-bolt is at a minimum. At the same time the horizontal component of the load is imposed as tension axially of the through-bolt.

In Fig. 7 there is illustrated a modification of the guy hook in which an integral conical spike 40 is employed in place of the separable lag screw 37, this spike being of the type as disclosed in the patent application of Kenneth C. Jenne, Serial No. 501,558 filed April 18, 1955, now Patent No. 2,901,798, dated September 1, 1959. A forwardly projecting drive head portion 41 is integrally provided upon the forward wall of the heel portion 11 in axially aligned relation with the spike whereby the spike is adapted to be driven into the pole by striking the drive head with a hammer or the like. After initial installation of the guy hook the spike will be further forced into the pole as the guy hook is overturned from its initial position through the pulling force of the guy cable exerted thereon.

As shown in Fig. 7a an integral conical spike 42 of square cross-section may be provided, as distinguished from the circular cross-section spike 40, its flat top and bottom surfaces being preferably horizontally disposed, so that it presents a flat bottom surface of substantially large area to increase its resistance to down-slotting.

The hook formation 21 integrally formed upon the upper side of the hub portion 10 is of substantially T-shape, and its dimensional relationship with the hub portion is directly related to the predetermined maximum cross-sectional thickness dimension of the loop connecting the guy cable to the guy hook, this relationship being such that the loop may assume any desired angular take-off position between a substantially vertical position and a horizontal position at 90 degrees to the axis of the pole without bending or distortion. To this end the vertical distance between horizontal planes respectively coinciding with the crown of the convexly curved top surface of the hub portion and with the lower surfaces 25a of the hook portions 25 is at least equal to the cross-sectional thickness dimension of the cable connecting loop. As shown by the dot-and-dash lines in Fig. 6 the loop in engagement with the crown of the hub portion may extend horizontally at each side of the neck portion 22 beneath the bottom surfaces 25a of the hook portions without bending or distortion and without exerting an upward force upon the hook portions. Thus horizontal pull upon the guy cable results in an overturning moment upon the guy hook causing its heel to increasingly dig into the pole as the pulling force is increased.

The dimensional relationship of the hook formation 21 to the hub portion is also such as to accommodate a guy cable connecting loop in the form of a hard or rigid U-shape bail or loop member 43, as illustrated in Figs. 8–12, and to permit of a take-off position of the loop member without bending or distortion at any desired angle between a substantially vertical position and a horizontal position at 90 degrees to the vertical axis of the pole. The loop member 43 constitutes part of a connector device of known design secured upon the end of the guy cable 44, this device consisting of a gripper or vise unit 45 provided with internal gripper or vise members which permit the cable to be inserted in the unit in one direction and restrains retractive movement in the other direction. This unit seats in a yoke member 46 in which it is retained by a flange 47 at its upper end engaged with the upper side of the yoke member, the yoke member in turn being engaged upon the side legs of the loop member 43 where it is retained by enlarged button ends 48 formed upon the ends of the side legs and engaged with the lower side of the yoke member.

In Figs. 8–12 the through-bolt is shown as provided with an integral head 49 upon its end engaged with the guy hook, a washer plate and tightening nut similar to the washer plate 34 and nut 35 as seen in Fig. 5 being provided upon its other end. Also, the buy hook is shown as provided with the integral spike 42 as shown in Fig. 7a.

The loop member 43 is formed into U-shape from heavy wire or rod stock, and its gauge or cross-sectional thickness dimension and the radius of curvature of the bight of the U-shape are directly related to the dimensional relationship existing between the hook formation 21 and the hub portion 10 of the guy hook. In particular the thickness dimension is no greater than the vertical distance between horizontal planes respectively coinciding with the crown of the hub portion and the under surfaces 25a of the hook portions 25, and the radius of the bight of the loop is such that it will approximately conform to the substantially semi-circular surface 23 of the neck portion 22, with the side legs of the loop disposed at each side of the side walls 15 of the guy hook and beneath the lower surfaces 25a of the hook portions inwardly of the downwardly extending outer ends or ears 25b of the hook portions.

Also, the length of the ears 25b is dimensionally related to the dimensional relationship between the hook formation and the hub portion of the guy hook and to the dimensions of the loop member 43 for the purpose of enabling the loop member in its assembled relation in the guy cable connector device to be readily engaged with the guy hook. To this end the location on the lower ends of the ears 25b is such that the loop member 43 may be readily engaged beneath the hook portion 25 at one side of the guy hook with one side leg resting upon the crown of the hub portion, as shown by dot-and-dash lines in Fig. 10, and may thereupon be swung beneath the ear of the hook portion 25 at the other side, as shown by full lines in Fig. 10, to a forwardly extending position, as shown by dot-and-dash lines in Fig. 10. In this latter position the side legs of the loop member are disposed at each side of the guy hook and it is free to swing vertically to any desired angular position between a substantially vertical position and a horizontal position at 90 degrees to the vertical pole axis, as shown by dot-and-dash lines in Fig. 9. It is further pointed out that the distance between the rearward side of the hook portion 21 and the pole surface, the curvature of the upper surface of the hub portion, and the projection and arrangement of the head 49 of the through-bolt 50 are such as to permit of the free swinging of the loop member 43 between the initially engaged and final operative positions as shown by dot-and-dash lines in Fig. 10, with the loop member slightly tilted in downward and forward direction as its inwardly disposed leg moves beneath the downwardly projecting ear 25b at one side of the hook formation, as shown in Figs 11 and 12.

In Figs. 13–17 there is illustrated a modified form of the invention comprising an upper hub portion 10a, a lower heel portion 11a, and an intermediate connecting portion 12a. The upper hub portion is substantially like the hub portion 10 of the embodiments of the invention illustrated in Figs. 1–12 and comprises an upper arched wall 14 defining the through bolt receiving passage which opens to the through bolt receiving hole 19 in the forward wall 17 of the hub portion, the latter being slightly arched in its vertical dimension so that a horizontal rounded ridge 20 is provided at each side of the hole 19 for rocking or slipping engagement with the retaining head 49 of the through bolt 50. The inner surface of the upper arched wall 14 of the through bolt receiving passage is inclined upwardly and outwardly from the substantially vertically disposed rearward pole engaging side of the hub portion so that it has fulcrum engagement, as at 38, with the through bolt 50, and the head 49 of the through bolt has rocking or slipping engagement with the ridge 20 in similar manner to the embodiments of the invention illustrated in Fig. 1–12.

The hook formation 21 is also similar in its structure and operation to the hook formation 21 shown in the embodiments of the invention illustrated in Figs. 1–12, the hook portions 25, however, being preferably convexly rounded at their rearward edges, as at 51, to provide greater clearance for the engagement and disengagement of the rigid loop member 43 of the guy cable.

The intermediate connecting portion 12a is provided with a strut-like inclined transverse wall 52 integrally connected between the side walls 15a and disposed at a substantially lesser inclination than the inclination of the forward edges 53 of the side walls, the inclination of the wall 52 being of the order of substantially 45°. The arrangement provides a recess 54 at the forward side of the intermediate portion and a recess 13a at the rearward side, the latter being of less vertical extent than the recess 13 of the embodiments illustrated in Figs. 1–12. The wall 52 extends to the rearward pole engaging side of the guy hook for direct support against the pole, and by virtue of its lesser inclination, as compared to the inclination of the forward wall 16 of the embodiments of the invention illustrated in Figs. 1–12, it meets the rearward surface of the heel portion 11a at a relatively high point of the guy hook, thus providing a relatively increased heel area for engagement with the pole.

The heel portion 11a is provided with an integral spike 42 and a forward drive head portion 41 similar to that illustrated in Fig. 7a, although it will be understood that the integral spike as shown in Fig. 7 or the separate lag screw 37 as shown in Figs. 1–6 may be employed if desired. The heel portion is flared outwardly to a substantial degree at each side, as at 27, and is provided at its lower edge with a tooth-like rib 28 for digging into the pole. Spurs 29 are suitably distributed in outwardly spaced relation to the integral spike 42 and additional spurs 30 are provided upon the rearward pole engaging side of the hub portion 10a.

The structural shape of the intermediate portion is such that under load and overturning action of the guy hook the strains thereon are substantially wholly in compression, thus greatly reducing the likelihood of distortion or fracture of the malleable cast iron structure of which the guy hook is preferably formed, through imposition of strains thereon in tension.

This results from the fact that the portions of the side walls 15a which project forwardly from the inclined transverse wall 52 provide a pair of reinforcing rib formations, one at each side of the wall 52, so that, as a bending strain is placed upon the wall 52 as load is imposed on the hub portion and the heel portion digs into the pole, the reinforcing rib formations spanning the angle between the inclined wall 52 and the vertical heel portion are placed under compression and thus effectually reinforce the wall 52 against distortion or fracture. In previous guy hook structures, wherein the side walls are entirely rearwardly of the inclined transverse wall of the intermediate portion, overturning strain thereon is imposed upon the side walls substantially wholly in tension.

What is claimed is:

1. In a guy hook for attachment to transmission line poles and the like, an upper hub portion having a passage therethrough for receiving a horizontal throughbolt provided with a retaining nut, head or the like, a forward bearing surface for engagement by said nut or the like having an opening constituting the forward end of said passage and of such size relatively to the through-bolt as to permit downward movement of said forward bearing surface relatively to said through-bolt, and a rearward pole-engaging surface to which the rearward end of said passage opens, a loop retaining formation on the upper side of said hub portion for engagement by a cable connecting loop, a lower pole-engaging heel portion, and an intermediate portion connecting said hub portion to said heel portion, the upper side of said passage being inclined upwardly and outwardly from its rearward to its forward end whereby its rearward end is adapted to have fulcrum engagement with the upper side of said through-bolt at a point contiguous to the pole surface and said guy hook is adapted as load is imposed upon said cable to tilt relatively to said horizontal through-bolt to cause said heel portion to dig into said pole.

2. The invention as defined in claim 1, further characterized in that said forward bearing surface of said hub portion is vertically arched to provide a bearing ridge for line contact sliding engagement with said retaining nut or the like.

3. The invention as defined in claim 1, further characterized in that said cable loop retaining formation comprises an upwardly extending hook means at the upper side of said hub having a rearwardly disposed cable loop engaging surface intermediate the forward and rearward ends of said hub portion.

4. In a guy hook for attachment to transmission line poles and the like, a hub portion having a passage therethrough for receiving a horizontal through-bolt provided with a retaining nut, head or the like, a top surface, a forward bearing surface for engagement by said nut, head or the like to which the forward end of said passage opens and a rearward pole engaging surface to which the rearward end of said passage opens, and a substantially T-shape loop retaining formation on the upper side of said hub portion in forwardly spaced relation to its rearward pole engaging surface for engagement by a cable connecting loop having a predetermined cross-sectional thickness dimension and including a bight and side legs, said loop retaining formation comprising an upright neck portion and a pair of hook portions extending laterally from opposite sides of said neck portion in a direction transverse to said through-bolt passage and having laterally aligned under surfaces, the forward spacing of said retaining formation from said rearward pole engaging surface being greater than said thickness dimension, and the vertical distance between horizontal planes respectively coinciding with said top surface of said hub portion and said under surfaces of said hook portions being at least equal to said thickness dimension, whereby the bight of said loop may be engaged about said neck portion and its side legs may extend forwardly beneath said hook portions in a substantially horizontal plane substantially spaced above the horizontal plane of said through-bolt without bending or distortion.

5. The invention as defined in claim 4, wherein the top surface of said hub portion is convexly curved transversely to the axis of said through-bolt passage.

6. The invention as defined in claim 4, wherein said neck portion has a rearwardly facing substantially semicircular convex surface adapted to substantially conform to the bight of a cable connecting loop engaged therewith.

7. The invention as defined in claim 4, further characterized by a pair of downwardly extending ears respectively upon the outer axis of said hook portions, each outwardly spaced from said neck portion a distance at least as great as the thickness dimension of said loop.

8. In a guy hook for attachment to transmission line poles and the like, a hub portion having a passage therethrough for receiving a horizontal through-bolt provided with a retaining nut, head or the like, a top surface, a forward bearing surface for engagement by said nut, head or the like to which the forward end of said passage opens and a rearward pole engaging surface to which the rearward end of said passage opens, and a substantially T-shape loop retaining formation on the upper side of said hub portion in forwardly spaced relation to its rearward pole engaging surface for engagement by a cable connecting substantially rigid loop having a predetermined cross-sectional thickness dimension and including a substantially semi-circular bight and substantially parallel side legs, said loop retaining formation comprising an upright neck portion of less transverse width than the inside width dimension of said loop, and a pair of hook portions extending laterally from opposite sides of said neck portion in a direction transverse to said through-bolt passage and having laterally aligned under surfaces, and a pair of downwrdly extending ears respectively upon the outer ends of said hook portions each outwardly spaced from said neck portion a distance at least as great as the thickness dimension of said loop and laterally spaced from each other a distance greater than the outside width dimension of said loop, the forward spacing of said retaining formation from said rearward pole engaging surface being greater than said thickness dimension, the vertical distance between horizontal planes respectively coinciding with said top surface of said hub portion and said under surfaces of said hook portions being at least equal to said thickness dimension, whereby the bight of said loop may be engaged about said neck portion and its side legs may extend forwardly beneath said hook portions in a substantially horizontal plane substantially spaced above the horizontal plane of said through-bolt without bending or distortion, and the downward extension of said ears being such in relation to the top surface of said hub portion and the under surfaces of said hook portions that said loop may be engaged with said hook formation in a position transverse to the axis of said through-bolt passage with its bight beneath one of said hook portions and its rearwardly disposed side leg in engagement with said top surface of said hub, and turned about said neck portion to pass said rearwardly disposed side leg forwardly under the ear of said other hook portion without bending or distortion of said loop.

9. The invention as defined in claim 8, wherein said top surface of said hub portion is convexly curved transversely to the axis of said through-bolt passage.

10. The invention as defined in claim 8, wherein said neck portion has a rearwardly facing substantially semicircular convex surface adapted to substantially conform to the bight of a cable connecting loop engaged therewith.

11. In a guy hook for attachment to transmission line poles and the like, an upper hub portion having a passage therethrough for receiving a horizontal through-bolt provided with a retaining nut, head or the like, a top surface, a forward bearing surface for engagement by said nut, head or the like having an opening constituting the forward end of said passage, and a rearward pole engaging surface to which the rearward end of said passage opens, a lower pole engaging heel portion, an intermediate portion connecting said hub portion to said heel portion, and a substantial T-shaped loop retaining formation on the upper side of said hub portion in forwardly spaced relation to its rearward pole engaging surface for engagement by a cable connecting loop having a predetermined cross-sectional thickness dimension and including a bight and side legs, said loop retaining formation comprising an upright neck portion, and a pair of hook portions extending laterally from opposite sides of said neck portion in a direction transverse to said through-bolt passage and having laterally aligned under surfaces, the forward spacing of said retaining formation from said rearward pole engaging surface being greater than said thickness dimension, and the vertical distance between horizontal planes respectively coinciding with said top surface of said hub portion and said under surfaces of said hook portions being at least equal to said thickness dimension, whereby the bight of said loop may be engaged about said neck portion and its side legs may extend forwardly beneath said hook portions in a substantially horizontal plane substantially spaced above the horizontal plane of said through-bolt without bending or distortion.

12. The invention as defined in claim 11, wherein said opening in said forward bearing surface is of such size relatively to the through-bolt as to permit downward movement of said forward bearing surface relatively to said through-bolt, and wherein the upper side of said through-bolt passage is inclined upwardly and outwardly from its rearward to its forward end whereby its rearward end is adapted to have fulcrum engagement with the upper side of said through-bolt at a point contiguous to the pole surface and said guy hook is adapted as load is imposed upon said cable to tilt relatively to said horizontal through-bolt to cause said heel portion to dig into said pole.

References Cited in the file of this patent

UNITED STATES PATENTS

| | | |
|---|---|---|
| 1,313,113 | Pleister | Aug. 12, 1919 |
| 2,643,428 | Jenne | June 30, 1953 |
| 2,874,439 | Jenne | Feb. 24, 1959 |
| 2,901,798 | Jenne | Sept. 1, 1959 |